United States Patent [19]
Young

[11] Patent Number: 6,006,292
[45] Date of Patent: Dec. 21, 1999

[54] METHOD OF MANAGING HARDWARE CONTROL BLOCKS UTILIZING ENDLESS QUEUE MAINTAINED TO NEVER BE EMPTY AND CONTAINING TAIL POINTER ONLY ACCESSIBLE BY PROCESS EXECUTING ON SYSTEM PROCESSOR

[75] Inventor: B. Arlen Young, Palo Alto, Calif.

[73] Assignee: Adaptec, Inc., Milpitas, Calif.

[21] Appl. No.: 08/815,645

[22] Filed: Mar. 13, 1997

[51] Int. Cl.[6] .................................. G06F 9/00; G06F 13/14
[52] U.S. Cl. ............................. 710/39; 710/22; 710/24; 710/36
[58] Field of Search ........................ 395/309, 500, 395/821, 872, 877, 844, 200.62; 710/39, 22, 24, 36

[56] References Cited

U.S. PATENT DOCUMENTS

| | | | |
|---|---|---|---|
| 4,543,626 | 9/1985 | Bean et al. ............................... | 364/200 |
| 4,601,586 | 7/1986 | Bahr et al. .......................... | 395/200.36 |
| 4,615,001 | 9/1986 | Hudgins .................................. | 395/672 |
| 4,682,284 | 7/1987 | Schrofer .................................. | 395/875 |
| 4,930,069 | 5/1990 | Batra et al. ......................... | 395/200.42 |
| 4,939,644 | 7/1990 | Harrington et al. ..................... | 395/825 |
| 4,975,829 | 12/1990 | Clarey et al. ............................ | 395/500 |
| 5,459,839 | 10/1995 | Swarts et al. ............................ | 395/292 |
| 5,548,795 | 8/1996 | Au ........................................... | 395/872 |
| 5,606,679 | 2/1997 | Cohn et al. ................................ | 711/4 |
| 5,619,685 | 4/1997 | Schiavone ................................ | 395/500 |
| 5,652,913 | 7/1997 | Crick et al. .............................. | 395/856 |
| 5,680,303 | 10/1997 | Libucha et al. ........................ | 364/138 |
| 5,729,681 | 3/1998 | Aditya et al. ......................... | 395/200.1 |
| 5,745,785 | 4/1998 | Shoji et al. .............................. | 395/827 |
| 5,781,199 | 7/1998 | Oniki et al. .............................. | 345/505 |

*Primary Examiner*—Thomas C. Lee
*Assistant Examiner*—Rehana Perveen
*Attorney, Agent, or Firm*—Forrest Gunnison

[57] ABSTRACT

A method for queuing TCBs for a system including a microprocessor and at least one host adapter device is based on an endless new TCB queue, that is managed such that the endless new TCB queue never goes empty. A device driver executing on the microprocessor manages an endless new TCB queue for each host adapter device in the system. The TCBs in the endless queue include a next TCB address field and a host adapter (HA) TCB array site field. The next TCB address field is used to couple TCB sites in a host memory into a linked list. The destination of a TCB in a host adapter (HA) TCB array is specified in the HA TCB array site field. The endless new TCB queue has head and tail pointer delimiters. The head pointer is accessible only by the host adapter device, and the tail pointer is accessible only by the device driver. The device driver appends a new TCB to the endless new TCB queue using the tail pointer to identify the next TCB storage site. For each TCB appended to the endless new TCB queue, the device driver increments a running count of the queued TCBs since initialization. The host adapter device determines that there is at least one new TCB in the endless new TCB queue when the queued TCB count is not equal to removed TCB count. The host adapter device removes a new TCB from the endless new TCB queue using the head pointer to identify the head TCB storage site.

17 Claims, 8 Drawing Sheets

METHOD OF MANAGING HARDWARE CONTROL BLOCKS UTILIZING ENDLESS QUEUE MAINTAINED TO NEVER BE EMPTY AND CONTAINING TAIL POINTER ONLY ACCESSIBLE BY PROCESS EXECUTING ON SYSTEM PROCESSOR

BACKGROUND OF THE INVENTION

1. Field of the Invention

The present invention is related generally to communications with host adapter integrated circuits, and in particular to methods of queuing hardware command blocks that are used in communicating tasks to one or more host adapter integrated circuits.

2. Description of Related Art

Hardware control blocks, sometimes called sequencer control blocks or SCSI control blocks (SCBs), are typically used for transferring information between a software host adapter device driver in a host computer and a host adapter integrated circuit that controls operations of one or more peripheral devices. Methods for queuing SCBs are known to those of skill in the art. For example, see copending and commonly assigned U.S. patent application Ser. No. 07/964,532 (now U.S. Pat. No. 5,659,690) entitled "Intelligent SCSI Bus Host Adapter Integrated Circuit," of Craig A. Stuber et al. filed on Oct. 16, 1992, which is incorporated wherein by reference in its entirety. See also copending and commonly assigned U.S. patent application Ser. No. 08/269,491 (now U.S. Pat. No. 5,625,800) entitled "A Sequencer Control Block Array External To A Host Adapter Integrated Circuit" of B. Arlen Young, et al. filed on Jun. 30, 1994; and also U.S. Pat. No. 5,564,023 entitled "Method for Accessing A Sequencer Control Block By A Host Adapter Integrated Circuit" of B. Arlen Young issued on Oct. 8, 1996, each of which is incorporated herein by reference in its entirety.

Typically, the software host adapter device driver, that transmits SCBs to the host adapter integrated circuit, included an operating system specific module (OSM) and a hardware interface module (HIM) that both were maintained in the host computer system. The OSM knew nothing about the hardware in the host adapter integrated circuit and communicated with both the host computer operating system and the HIM. The HIM communicated only with the host adapter integrated circuit and the OSM. The OSM supplied information to the HIM that in turn built a SCB. Alternative methods for queuing the SCBs by the HIM and the host adapter integrated circuit are described in the patents referenced above and so are not repeated herein.

In another application illustrated in FIG. 1, only a single host adapter device 120 is illustrated. However, multiple host adapter devices 120 could be used. Host adapter device 120 has an internal microprocessor 125, referred to as sequencer 125. Sequencer 125 controls a DMA engine 140 and is coupled to random access memory 150, and two counters 131 and 132. DMA engine 140 is coupled to host computer I/O bus 160, such as a PCI bus. Further, as is known to those of skill in the art, host adapter device 120 includes bus interface circuits and other circuits that are not shown because the additional circuits are not of importance to understanding the prior art queuing of hardware command blocks.

In this example, an external microprocessor is host computer microprocessor 105. Similar to the operations described above, in response a call from a process executing on microprocessor 105, an OSM 101 executing on microprocessor 105 sends information to HIM 102, that also executes on microprocessor 105. HIM 102 uses the information to build a transfer command block (TCB), that is similar to a sequencer command block.

HIM 102 manages host adapter device 120. Task requests from HIM 102 to host adapter device 120 are made via TCBs. HIM 102 delivers new TCBs to sequencer 125 for execution, and receives completed TCBs from sequencer 125 via queues common to both HIM 102 and sequencer 125.

HIM 102 delivers new TCBs via a new TCB pointer queue 112, and receives completed TCBs via a done TCB pointer queue (not shown). These queues are circular, contiguous lists of pointers to TCBs, or alternatively TCBs, with head and tail pointers delimiting each queue. Each queue of TCB pointers defines a queue of TCBS. The queues are not linked lists, because a queue element does not contain information that relates that queue element to another element of the queue.

Only new TCB pointer queue 112 in host memory 111 is considered herein. A head pointer 156 to the head TCB pointer in new TCB pointer queue 112 is managed by sequencer 125, and a tail pointer 116 to the tail TCB pointer in new TCB pointer queue 112 is managed by HIM 102. As explained more completely below, counters 131 and 132 in host adapter device 120 enable HIM 102 to communicate to sequencer 125 how many TCBs are available via new TCB pointer queue 112. Specifically, HA queued TCB counter 131 is written only by HIM 102, and is only read by sequencer 125. Removed TCB counter 132 is accessed only by sequencer 125.

When HIM 102 builds a new TCB, HIM 102 allocates a site in HA TCB array 155 for the new TCB. The new TCB pointer includes the site in HA TCB array 155, and the host memory address of the storage location of the TCB in host TCB array 115.

HIM 102 maintains tail pointer 116 to identify the next free location in TCB pointer queue 112. HIM 102 appends the new TCB pointer at the next host memory address in queue 112 that immediately follows the address stored in tail pointer 116.

After appending the TCB pointer to TCB pointer queue 112, HIM advances tail pointer 116 to the address of the new end of queue 112. When the tail address advances beyond the address allocation for TCB pointer queue 112, HIM 202 replaces the out-of-bounds tail address with the base address of TCB pointer queue 112, according to the definition of a circular queue.

For each TCB pointer appended to TCB pointer queue 112, HIM 102 increments the count in queued TCB counter 131 on host adapter device 120. HIM 102 also maintains a copy of the value of queued TCB counter 131 in queued TCB counter 117 in host memory 111. Thus, HIM 102 does not have to read counter 131 prior to the increment which saves a PIO on host computer bus 160.

Queued TCB counters 117 and 131 maintain a running count of the total number of TCB pointers appended to TCB pointer queue 112 since initialization. Counters 117 and 131 roll over to zero when tail pointer 116 rolls over to the base address of TCB pointer queue 112.

Sequencer 125 uses removed TCB counter 132 to keep a running count of the TCB pointers removed from TCB pointer queue 112 since initialization. Thus, to determine whether an additional TCB or TCBs are available for processing, sequencer 125 compares the values of removed TCB counter 132 and queued TCB counter 131.

Sequencer 125 determined that there was at least one new TCB pointer in TCB pointer queue 112 when the value of removed TCB counter 132 was not equal to the value of queued TCB counter 131. Sequencer 125 uses head pointer 156 to determine the location of the next TCB pointer to transfer. Recall that the TCB pointers are stored in contiguous memory locations. Head pointer 156 is the address of the next TCB pointer to be removed from queue 112. Since TCB pointers are to be removed from TCB pointer queue 112 in order only, and a TCB pointer is never skipped, sequencer 125 knows that the next TCB pointer is at the address in queue 112 that is in head pointer 156.

Sequencer 125 configures DMA engine to transfer the new TCB pointer at the head of TCB pointer queue 112 to a temporary buffer. The new TCB pointer specifies a site in HA TCB array 155 and the address in host memory 111 where the TCB is stored. This information is provided to DMA engine 140 that in turn loads the TCB in the specified TCB site in HA TCB array 155 for subsequent execution. Each TCB site in HA TCB array 155 is 128 bytes in size. Practical arrays can contain in excess of 1500 sites.

Following the two DMA transfers, sequencer 125 increments removed TCB counter 132 and advances head pointer 156 in preparation for accessing another TCB pointer in queue 112 at a later time. Head pointer rollover is handled in the same manner as described for tail pointer rollover. Removed TCB counter 132 rolls over to zero when head pointer 156 rolls over to the base address of queue 112.

This example used a circular queue of TCB pointers, which minimized the number of contiguous memory locations required. However, some applications require a circular queue of TCBs. The use of a circular queue of TCBs eliminates the DMA transfer of the TCB pointers, but such a circular queue requires a large number of contiguous memory locations in a block of memory 111. With the exception of the elimination of the TCB pointer DMA transfer, the operation of the circular queue of new TCBs is the same as the operation described above.

Also, HIM 102 must maintain a copy of a TCB until after execution of the TCB has been completed by host adapter 120. Execution of some TCBs can take a very long time, during which the TCB site in a circular queue will need to be reused for delivering a different TCB. Therefore, HIM 102 must create two copies of a TCB: one in the circular queue, and the other for future reference. This further complicates the management and use of memory 111. A method is needed for queuing new TCBs that does not suffer from the shortcomings associated with a circular queue of TCBs or of TCB pointers.

SUMMARY OF THE INVENTION

In accordance with the principles of this invention, a method for queuing hardware command blocks, that are used to transfer commands from a device driver to a device on an I/O bus, and transferring hardware command blocks utilizes an endless new hardware command block queue that never goes empty. The endless queue of this invention is considered an array of hardware control block storage sites because not all sites in the endless queue contain a valid hardware control block.

The endless new hardware command block queue and new hardware command block delivery process of this invention are particularly advantageous for systems with host adapter devices that share the hardware control block delivery path with data transfers, and so traffic along the delivery path associated with hardware control block deliveries must be minimized. This invention eliminates the need to transfer hardware command block pointers over the delivery path, and eliminates the prior art requirements for circular buffer queues. This simplifies the queue management and as a result the processes used in the device driver and the host adapter device for hardware command block queue management and delivery.

This invention is also particularly advantageous because it permits the device driver to notify a host adapter device that a new hardware command block is in endless new hardware command block queue of this invention without pausing the host adapter device processor and without the device processor having to poll registers external to the host adapter device.

The endless hardware command block queue of this invention eliminates the need for the prior art circular queue of hardware command block pointers. This has two advantages. First, the host memory used by the prior art circular queue of pointers is available for other uses. Second, the DMA transfers of the pointers is eliminated which reduces the traffic on the I/O bus.

Converting the prior art circular queue of hardware command blocks to an endless queue of hardware command blocks eliminates the requirement that all new hardware command blocks be located in a single contiguous block of host memory. For a large circular queue, such an allocation of memory for a circular queue is not possible for some host operating systems.

As explained above, some host adapter users require a circular queue of hardware command blocks to eliminate one DMA transfer, and other users require a circular queue of pointers to hardware command blocks to reduce the size of the circular queue. The endless new hardware command block queue of this invention can be used by both types of users, and therefore a single set of software and firmware can satisfy both requirements.

According to the principles of this invention, a method of management of hardware control blocks for a device coupled to a system processor by a bus maintains an endless queue of hardware command block storage sites in a memory accessible by both a device driver executing on the system processor and a process executing on a device processor of the device. The device driver changes a first count each time a hardware command block is loaded in the endless queue. The first count is readable by the process.

In this method, the process changes a second count each time a hardware command block is removed from the endless queue. In one embodiment, the device is a host adapter device, and the first and second counts are stored within the host adapter device.

Also, in this method, a head hardware command block storage site of the endless queue is addressed using a head pointer. The head pointer is changed only by the process. A tail hardware command block storage site of the endless queue is addressed using a tail pointer. The tail pointer is changed only by the device driver.

Also, in the method of this invention, an array site for storage of a hardware command block is specified in a hardware command block array of the device in a field of the hardware command block. A storage site for a second hardware command block in the endless queue is specified in a next hardware control address field of a first hardware command block hardware command block.

One important aspect of this invention is that the endless queue is never empty. Thus, when a hardware command block for a device is loaded in a storage site of an endless queue pointed to by a tail pointer, another storage site is allocated in the endless queue. A field of the hardware command block with a pointer to the next storage site, and a count of hardware command blocks in the endless queue are updated.

DETAILED DESCRIPTION

Figure 1:
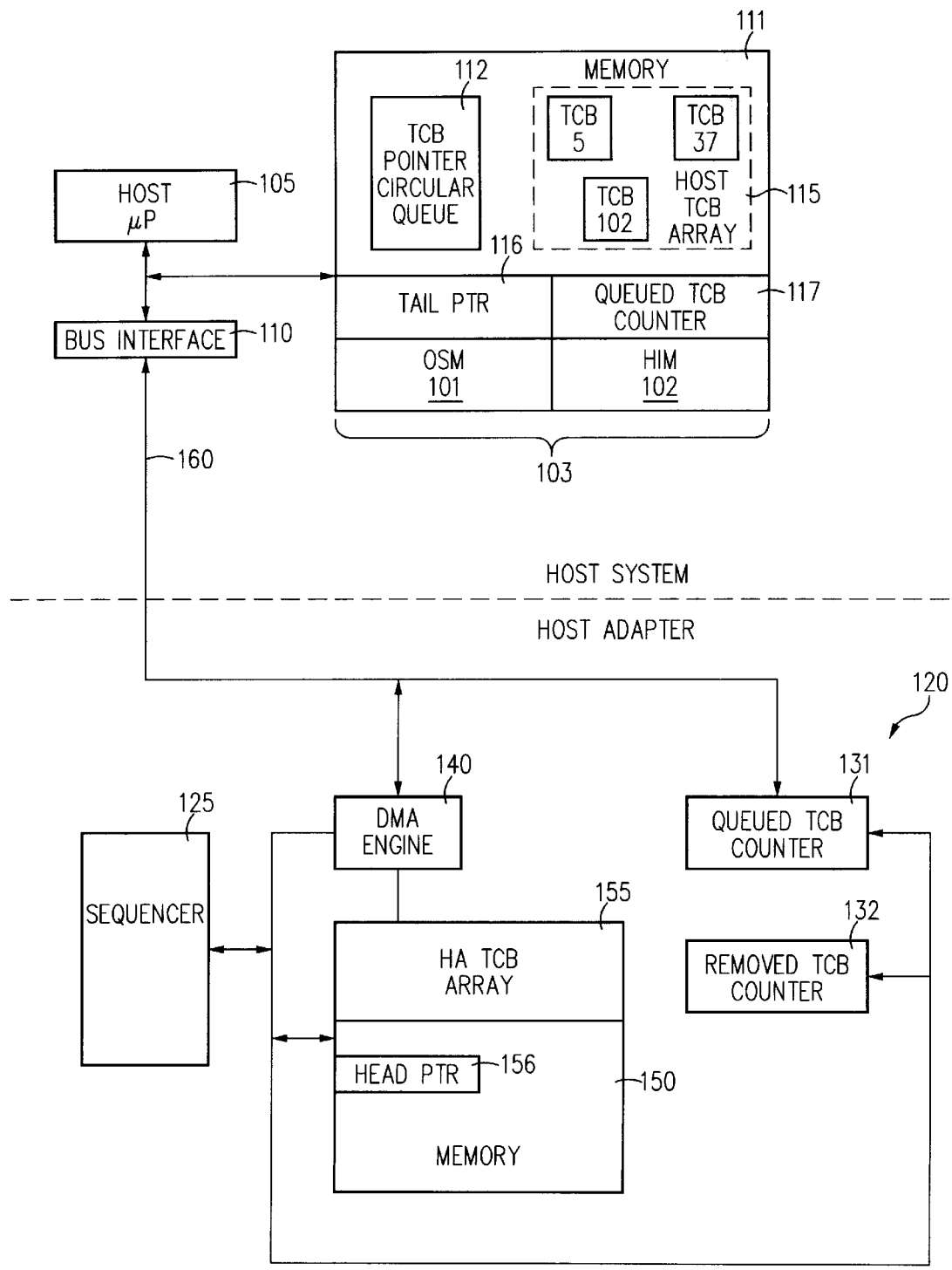
FIG. 1 is a diagram of a prior art system that utilized a circular queue to manage delivery of hardware command blocks from a host computer to a host adapter device.

In accordance with the principles of this invention, a method for queuing TCBs for a system 200 including a microprocessor 105, sometimes called a system processor, and at least one host adapter device 220 that includes an onboard sequencer 225, sometimes called a device processor, is based on an endless new TCB queue 215, that is managed such that endless new TCB queue 215 never goes empty. As explained more completely below, endless new TCB queue 215 is an endless queue of TCB storage sites within the memory space of device driver 203. Queue 215 is considered an array of TCB storage sites because some sites do not contain valid TCBs.

Device driver 203, that executes on microprocessor 105, manages host adapter device 220 using TCBs. Specifically, in response to a command from a calling program executing on the host computer, an OSM 201 of device driver 203, that executes on microprocessor 105, transfers information for a command to HIM 202 of device driver 203 that also executes on microprocessor 105. HIM 202 uses the information to build a TCB or TCBs that implement the command.

HIM 202 manages host adapter devices, e.g., host adapter device 220, that are on the host computer I/O bus, which in this embodiment is PCI bus 260. PCI bus 260 is coupled to microprocessor 105 by a PCI bus interface circuit 110. The management performed by HIM 202 includes management of an endless new TCB queue for each host adapter device on PCI bus 260. Herein, only a single host adapter device is considered. However, this description is applicable for each host adapter device managed by HIM 202.

Unlike the prior art TCBs described above, the TCBs of this invention have two additional fields, a next TCB address field and a host adapter (HA) TCB array site field that are utilized by HIM 202, as explained more completely below, for delivery of new TCBS. The other aspects of the TCBs are similar to those of the prior art.

The next TCB address field is used to couple TCB sites 201 to 203 in host memory 211 in a linked list. Thus, next TCB address field 201A of TCB site 201 addresses TCB site 202, and next TCB address field 202A of TCB site 202 addresses TCB site 203. Since TCB site 203 is at the end of the linked list, the address in next TCB address field 203A is undefined.

The destination of a TCB in host adapter (HA) TCB array 255 is specified in the HA TCB array site field. In TCB 201, HA TCB array site field 201B points to TCB site 5 in HA TCB array 255, and HA TCB array site field 202B points to TCB site 37. HA TCB array site field 203B is undefined because TCB site 203 is empty.

Note that the HA TCB array site field specifies the destination for TCB in host adapter memory 250 in a DMA transfer, whereas next TCB address field specifies the source address for the next TCB to be DMAed from host memory 211. As explained more completely below, this feature allows HIM 202 to allocate the host adapter TCB array site immediately prior to appending the TCB to new endless TCB queue 215, rather than forcing HIM 202 to pre-allocate the TCB array site prior to generating the TCB. In many cases, a TCB must be loaded into a particular HA TCB array site, which is a function of the TCB contents. These contents cannot be anticipated ahead of time. Conversely, the TCB address queue storage site in host memory 211 is not a function of TCB contents, and can, therefore, be allocated ahead of time.

Endless new TCB queue 215 has head and tail pointer delimiters. Head pointer 256 is accessible only by sequencer 225 in scratch memory 255 following initialization, and tail pointer 216 is accessible only by device driver 203 in host memory 211. As explained more completely below, head and tail pointers 256 and 216 are used and managed in a manner similar to that described above, except since new TCB queue 215 is endless, rollover of the pointers is not considered. This makes the management of the pointers easier than the management of the prior art pointers.

HIM 202 appends a new TCB to endless new TCB queue 215, using tail pointer 216 to identify the next TCB storage site in host memory 211. The new TCB is written to the storage site addressed by tail pointer 216. HIM 202 next allocates another TCB storage site in host memory 211 for another TCB, that will be appended to endless new TCB queue 215 in the future. HIM 202 loads the address for the another TCB storage site number into next TCB address field of the new TCB being appended to endless new TCB queue 215, and into tail pointer 216.

For each TCB appended to endless new TCB queue 215, HIM 202 increments a running count of the queued TCBs since initialization and, loads that count into queued TCB register 231 on host adapter device 220. HIM 202 maintains a copy of this count in queued TCB count register 217 in host memory 211. Hence, HIM 202 can increment the count without reading the count stored on host adapter device 220. The count rolls over to zero when it is incremented to the number of sites in host adapter TCB array.

Sequencer 225 determines that there is at least one new TCB in endless new TCB queue 215 when the count in queued TCB count 231 is not equal to a count in removed TCB counter 232. Each time sequencer 225 removes a new TCB from endless new TCB queue 215, sequencer increments removed TCB counter 232. Thus, when the counts are not equal, one or more new TCBs are available for execution in endless new TCB queue 215.

When the counts are unequal, sequencer 225 uses queue head pointer 256 in memory 215 to identify the TCB at the head of queue 215. TCBs are removed from queue 215 in order only by sequencer 225; a TCB is never skipped.

Sequencer 225 configures DMA engine 140 to transfer the head TCB, as identified by head pointer 256, from host memory 211 to an intermediate buffer 260. As explained above, the TCB contains the destination site in HA TCB array 255 in the HA TCB array site field. Hence, upon completion of the DMA transfer, sequencer 225 reads the HA TCB array site from intermediate buffer 260. Sequencer 225 configures DMA engine 140 to transfer the TCB from intermediate buffer 260 to the specified TCB array site in HA TCB array 255.

Following the DMA transfer to HA TCB array 255, sequencer 225 updates head pointer 256 by copying the address in next TCB address field to head pointer 256 in preparation for the DMA transfer of another TCB at a later time. Since endless new TCB queue 215 never ends, there is no pointer rollover to be considered because the queue is not circular.

The endless TCB queue of this invention eliminates the need for the prior art circular queue of TCB pointers. This has two advantages. First, the host memory used by the prior art circular queue of TCB pointers is available for other uses. Second, the DMA transfers of the TCB pointers are eliminated which reduces the traffic on bus 260.

Converting the prior art circular queue of TCBs to an endless queue of TCBs eliminates the requirement that all new TCBs be located in a single contiguous block of host memory. For a large circular queue, such an allocation of memory for a circular queue is not possible for some host operating systems.

As explained above, some host adapter users require a circular queue of TCBs to eliminate one DMA transfer, and other users require a circular queue of pointers to TCBs to reduce the size of the circular queue. Endless new TCB queue 215 can be used by both types of users, and therefore a single set of software and firmware can satisfy both requirements.

As described above, eliminating the circular queues eliminates the management of queue rollover. This simplifies both HIM firmware and host adapter hardware.

Also, as explained above, for the prior art circular queues, HIM 102 must create two copies of a TCB: one in the circular queue, and the other for future reference to allow reuse of sites in the circular queue. Endless new TCB queue 215 of this invention is not constrained to reuse queue sites. A TCB delivered via queue 215 can be retained indefinitely while an unlimited number of subsequent TCBs are delivered. Therefore, HIM 202 need create only one copy of the TCB, which is a significant savings of HIM execution time.

Figure 2:
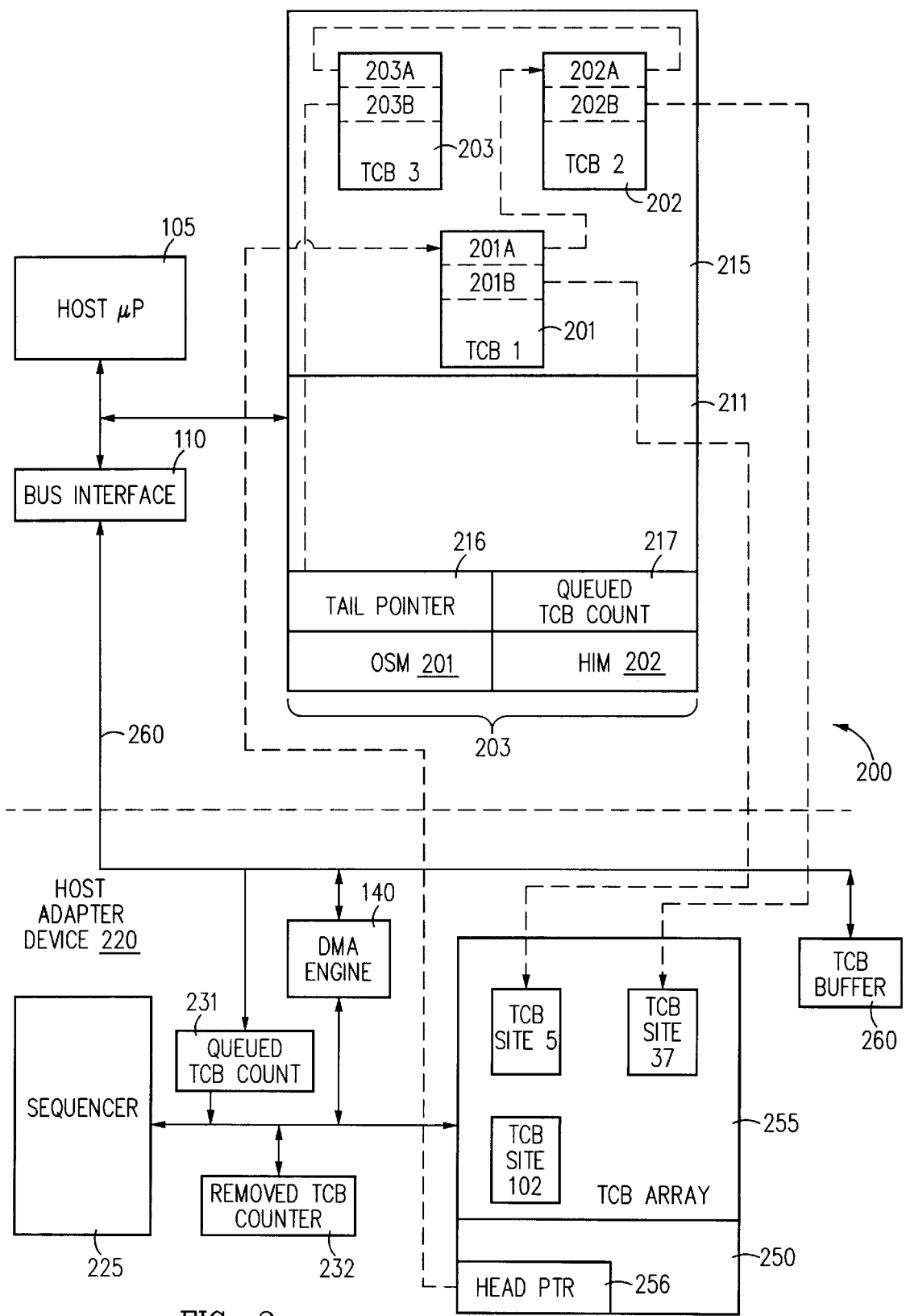
FIG. 2 is a diagram of a system that utilizes an endless queue of this invention in managing delivery of hardware command blocks from a host computer to a host adapter device.
Figure 3A:
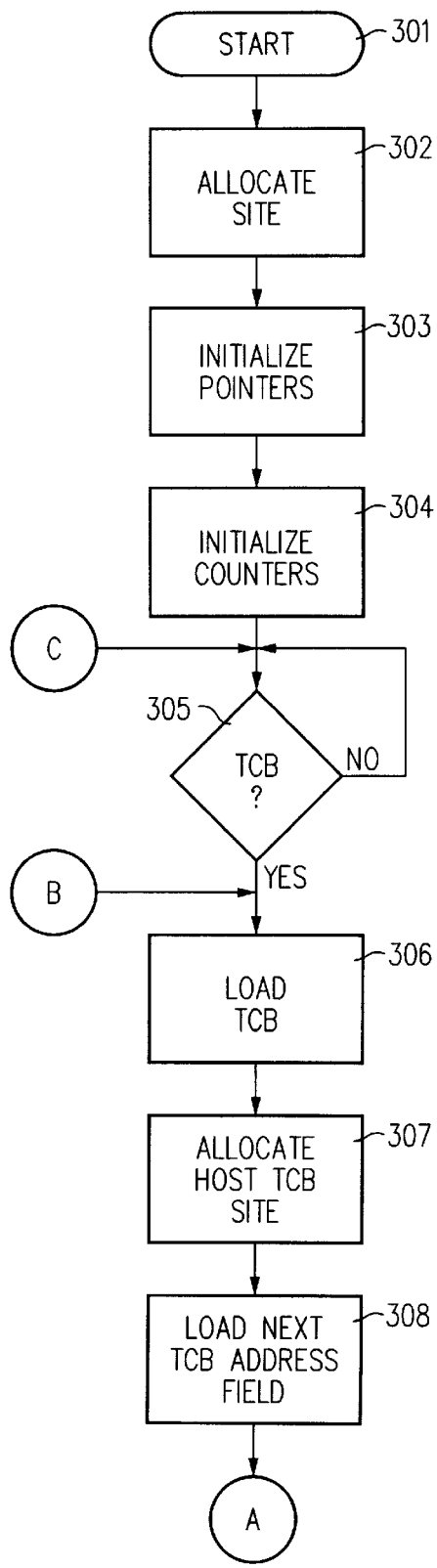
FIGS. 3A and 3B are a process flow diagram for management of endless new TCB queue by a host adapter device driver according to the principles of this invention.
Figure 3B:
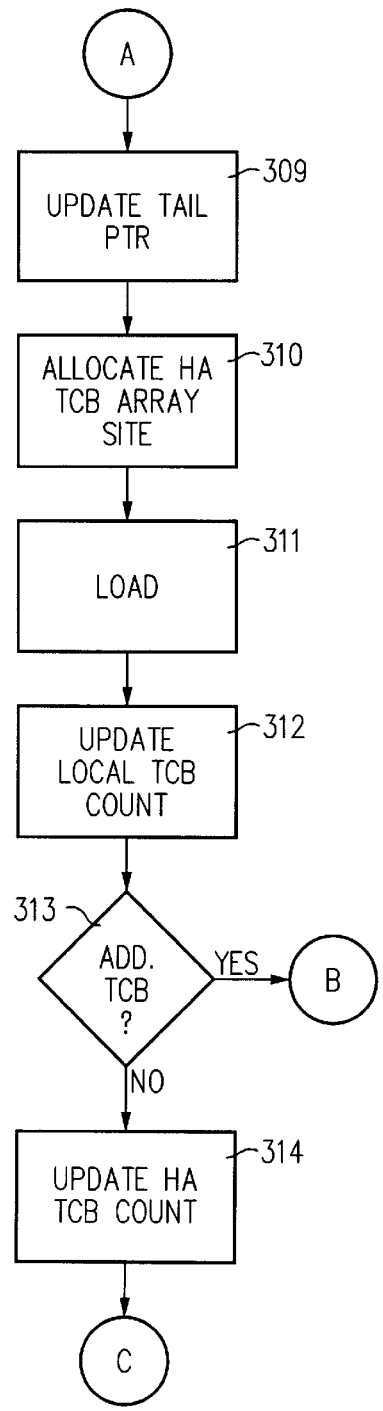

FIGS. 3A and 3B are a process flow diagram for management of endless new TCB queue 215 by HIM 202. Upon start 301 of endless new TCB queue management process 300, HIM 202 allocates a new TCB site in host memory 211 to endless new TCB queue 215 in allocate site operation 302, even though HIM 202 has not yet built a TCB for execution. In this example, allocated TCB site 401 is located at PCI hex address 17662014 (FIG. 4A) (In FIG. 4A, the various pointers, registers and blocks are shown for ease of illustration only. The location of the various components is illustrated in FIG. 2). Upon allocation of the TCB site, processing transfers from operation 302 to initialize pointers operation 303.

Figure 4A:
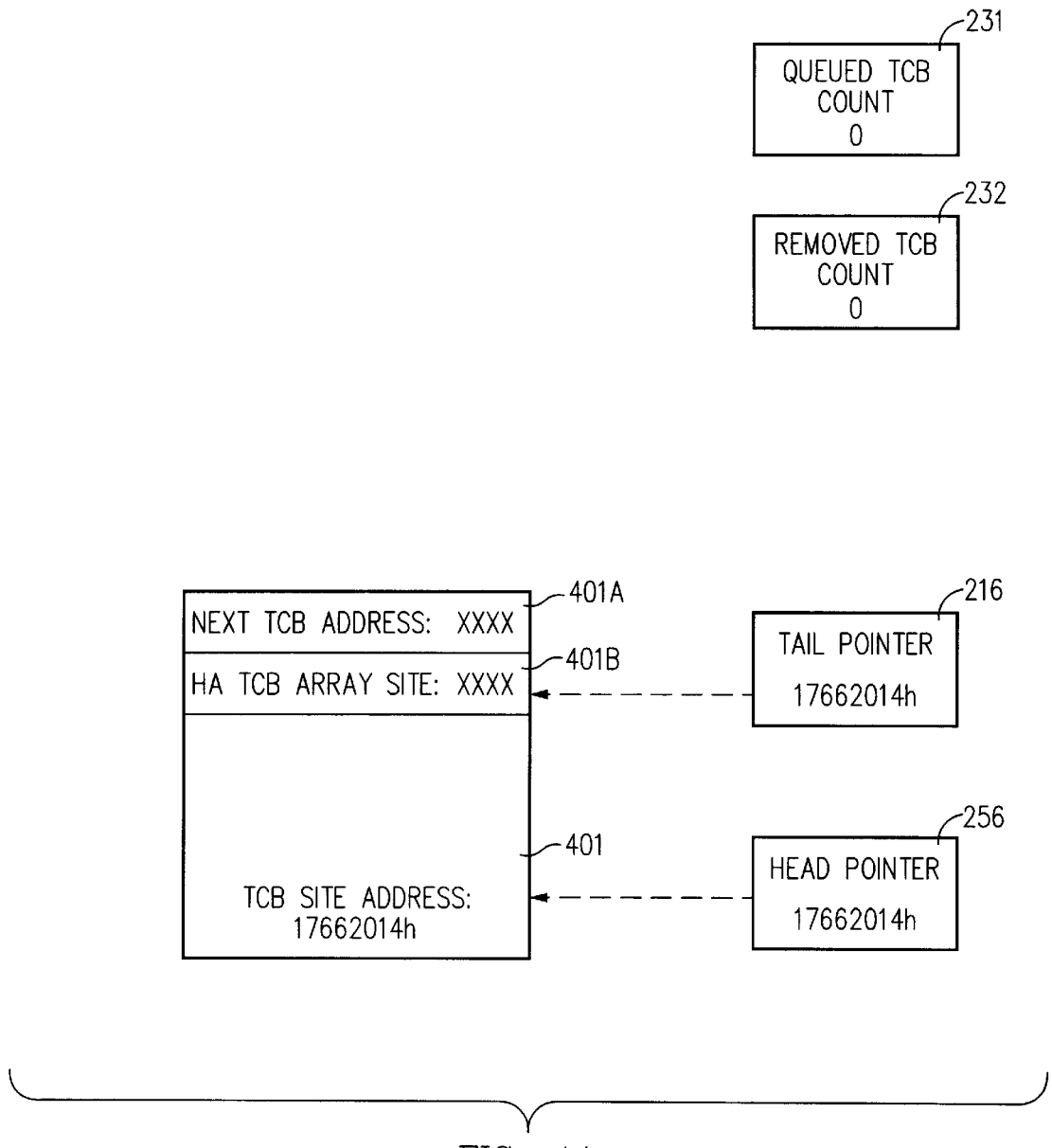
FIGS. 4A to 4D illustrate one embodiment of the configuration of endless new TCB queue as the process illustrated in FIGS. 3A and 3B is performed by the host adapter device driver.

In initialize pointers operation 303, HIM 202 loads tail pointer 216 in memory 211 with the address of the allocated TCB site and also initializes head pointer 256 in memory 255 to this address (FIG. 4A). This is the only time HIM 202 accesses head pointer 256. Upon completion of operation 303, processing transfers to initialize counters operation 304.

In initialize counters operation 304, HIM 202 initializes queued TCB counter 231 and removed TCB counter 232 to a predefined value, which in this embodiment is zero (FIG. 4A). Operations 302 to 304 complete the initialization of endless new TCB queue management process 300. Consequently, process 300 is suspended until HIM 202 receives information for building at least one TCB. This is represented by TCB check operation 305.

After completion of initialization, sequencer 225 may look for new TCBs to execute. As explained above, sequencer 225 compares counters 231 and 232. Upon determining that counter 231 and 232 have the same value, sequencer 225 concludes that there are no new TCBs to execute in queue 215.

Eventually, HIM 202 receives requests from a caller program to generate TCBs via OSM 201, and in this example, HIM 202 generates two TCBS. Specifically, HIM 202 leaves check operations 305 and initiates load TCB operation 306. In operation 306, HIM 202 loads the first TCB into TCB site 401 in memory 211 that is identified by tail pointer 216, that is, the site at address 17662014h.

After loading the TCB, HIM 202 allocates another TCB site 402 (FIG. 4B) in host memory 211 in allocate host TCB site operation 307. In this example, the TCB site is at PCI address 1300007 4h.

Following completion of operation 307, HIM 202 links TCB site 402 to the TCB loaded in site 401 in load next TCB address field operation 308. In operation 308, HIM 202 loads the address of TCB site 402 into next TCB site field 401A of TCB loaded in site 401. Operation 308 transfers processing to update tail pointer operation 309.

In update tail pointer operation 309, HIM 202 writes the address of the TCB site 402, i.e., the address of the new tail TCB of queue 215, into tail pointer 216 (FIG. 4B), and transfers processing to allocate host adapter TCB array site operation 310.

Figure 4B:
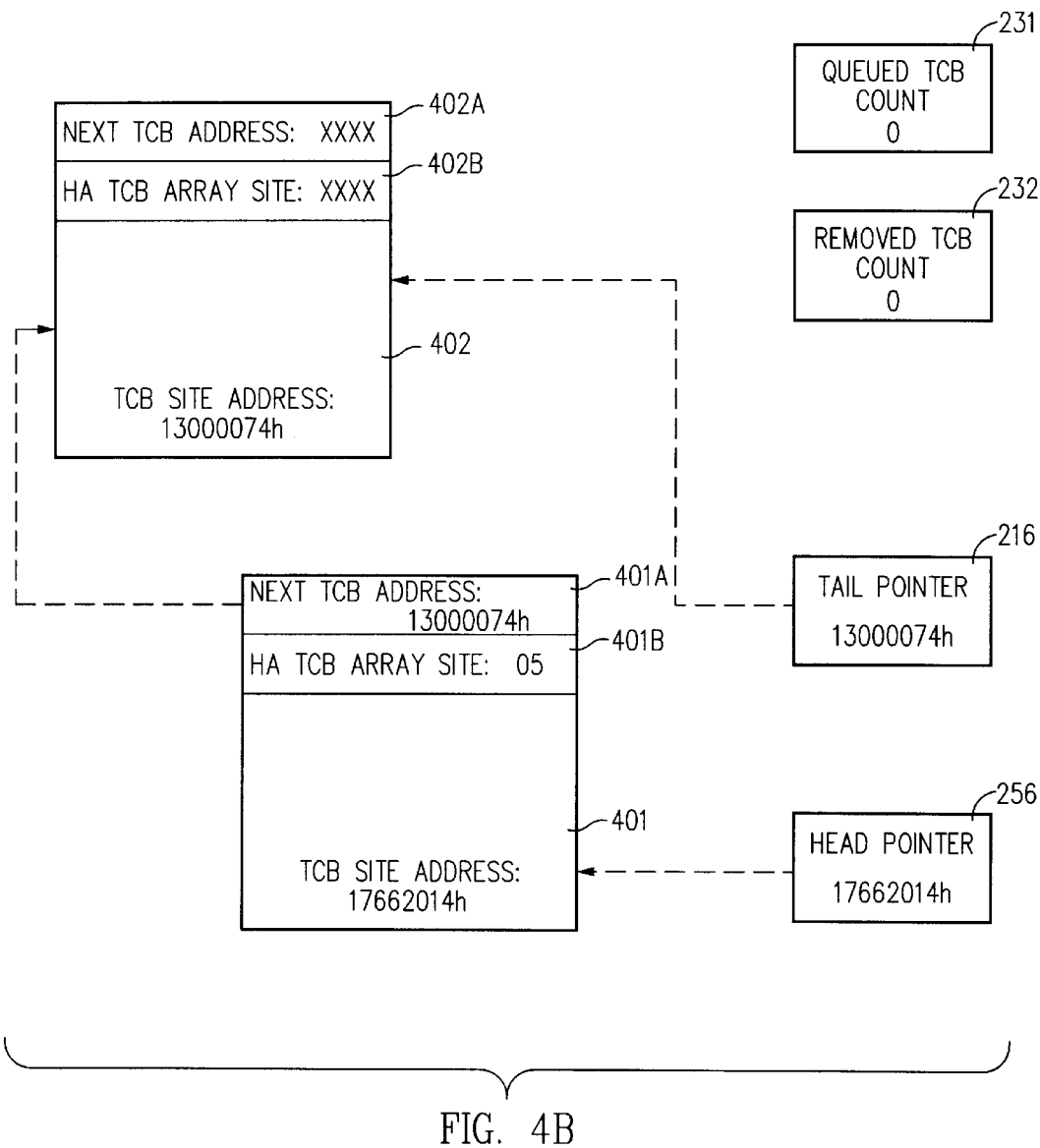

In operation 310, HIM 202 allocates a site for the first TCB in host adapter TCB array 255. In this example, HIM 202 chooses site 5 and transfers to load host adapter TCB array site operation 311 that in turns loads the chosen TCB array site in HA TCB array site field 401B (FIG. 4B). Operations 311 transfers to update local TCB count operation 312.

In update local TCB count operation 312, HIM 202 reads queued TCB count register 217, adds one to the value, and stores the new value back in queued TCB count register 217. Alternatively, a local counter could be used and TCB count register 217 updated only after all the new TCBs are processed.

Operation 312 transfers to additional TCB check operation 313. Since, in this example, two TCBs are being generated, check operation 312 transfers processing to load TCB operation 306. If only a single TCB were being generated, check operation 313 would transfer to update host adapter counter operation 314.

Upon returning to operation 306, HIM 202 loads the second TCB into TCB site 402 in memory 211 that is identified by tail pointer 216, that is, the site at address 13000074h.

After loading the second TCB, HIM 202 allocates another TCB site 403 (FIG. 4C) in host memory 211 in allocate host TCB site operation 307. In this example, the next TCB site is at PCI address 20F98802h.

Following completion of operation 307, HIM 202 links TCB site 403 to the second TCB loaded in site 402 in load next TCB address field operation 308. In operation 308, HIM 202 loads the address of TCB site 403 into next TCB site field 402A (FIG. 4C) of the TCB loaded in site 402. Operation 308 transfers processing to update tail pointer operation 309.

In update tail pointer operation 309, HIM 202 writes the address of the TCB site 403, i.e., the address of the new tail TCB of queue 215, into tail pointer 216, and transfers processing to allocate host adapter TCB array site operation 310.

Figure 4C:
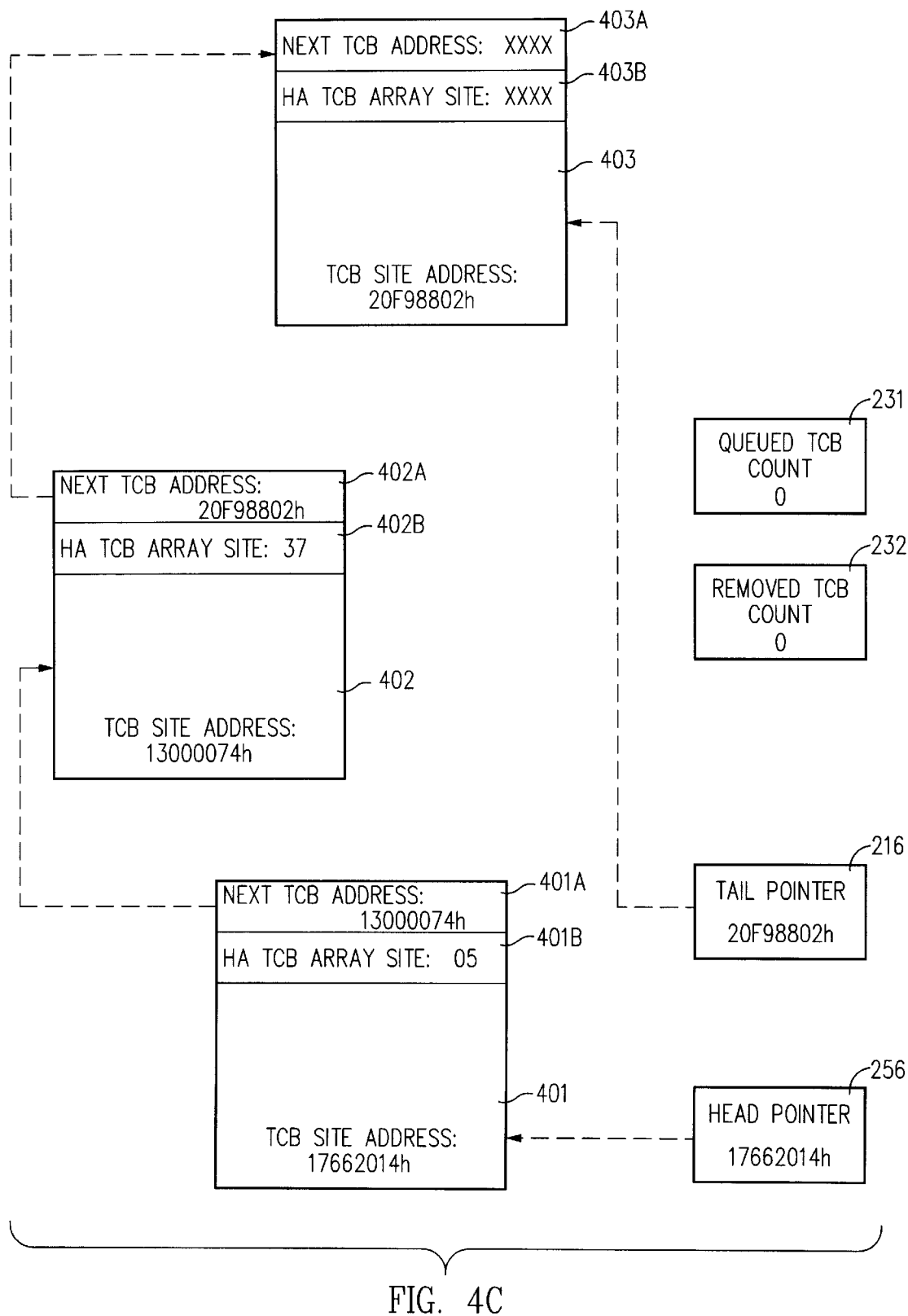

In operation 310, HIM 202 allocates a site for the new TCB in host adapters TCB array 255. In this example, HIM 202 chooses site 37 and transfers to load host adapter TCB array site operation 311 that in turns loads the chosen TCB array site in HA TCB array site field 402B (FIG. 4C). Operations 311 transfers to update local TCB count operation 312.

In update local TCB count operation 312, HIM 202 reads queued TCB count register 217, adds one to the value, and stores the new value back in queued TCB count register 217. Operation 312 transfers to additional TCB check operation 313. Since, in this example, only two TCBs are being generated, check operation transfers processing to update host adapter counter operation 314.

Figure 4D:
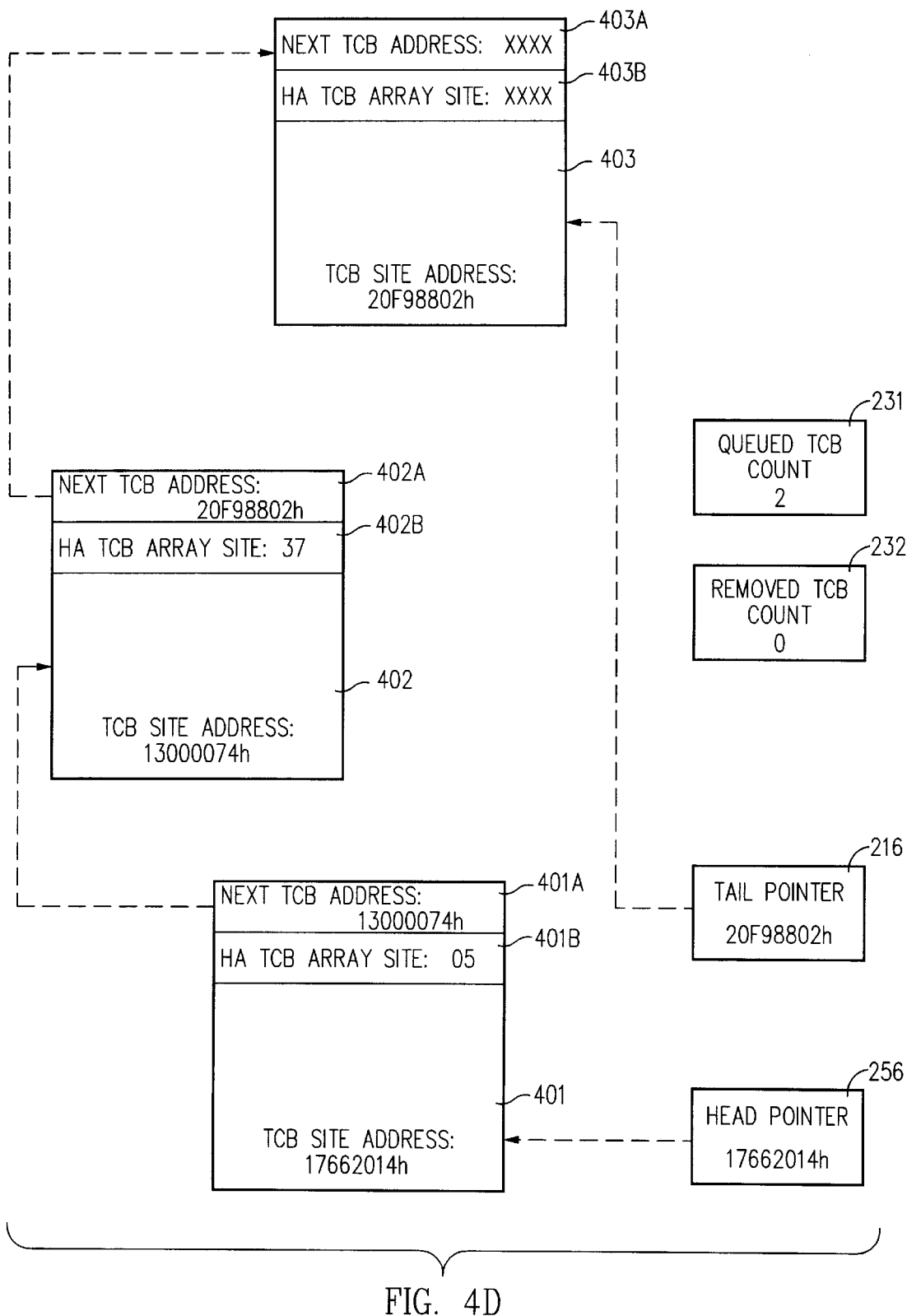
Figure 5:
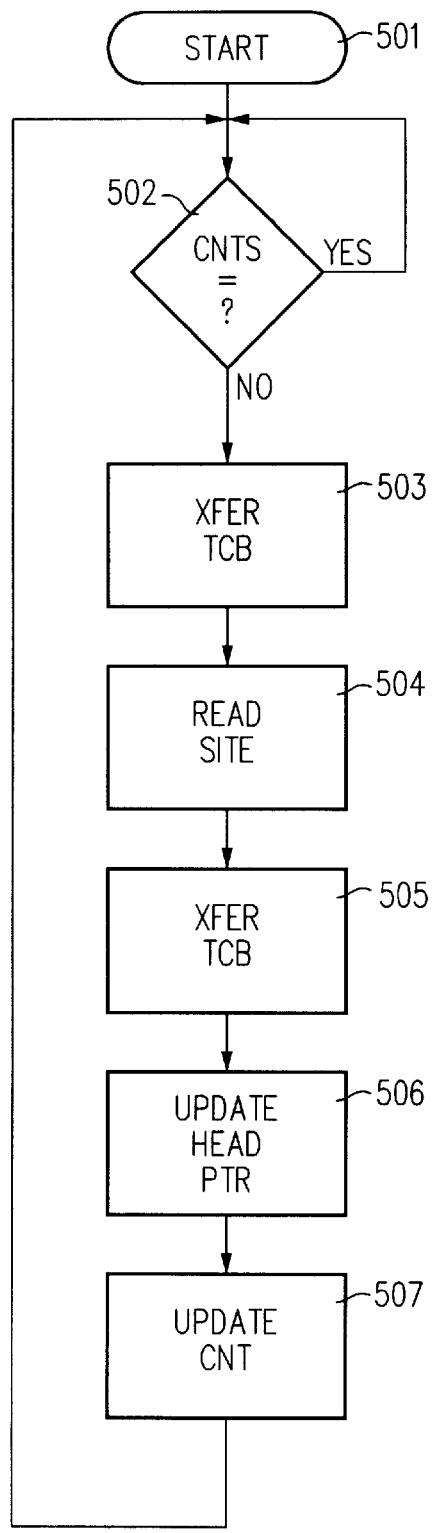
FIG. 5 is a process flow diagram of the operations performed by a host adapter sequencer to transfer a hardware command block from the endless new TCB queue to a host adapter array.

In update host adapter counter operation 314, HIM 202 copies the value in queued TCB register 217 to queued TCB count register 231. Thus, as shown in FIG. 4D, the values of queued TCB count register 231 and removed TCB counter 232 are no longer equal.

Until HIM 202 updates queued TCB count register 231, sequencer 225 is unaware of the two new TCBs appended to endless new TCB queue 215. HIM 202 has defined the two new TCBs and the new value of tail pointer 216 through a sequence of operations of its choice, and without in anyway affecting the operation of sequencer 225. Only when the update of endless new TCB queue 215 is complete does HIM 202 advise sequencer 225 of the new TCBs appended to queue 215 by updating queued TCB count register 231. At the instant of writing register 231, sequencer 225 is able to recognize that two new TCBs are in queue 215.

Specifically, sequencer 225 starts update host adapter TCB process 500 and in check counts operation 502 recognizes that the value of queued TCB count 231 is not equal to removed TCB count 232 and so processing transfers to transfer TCB operation 503.

In transfer TCB operation 503, sequencer 225 configures DMA engine 140 to transfer a new TCB from endless new TCB queue 215 in host memory 211 to intermediate buffer 260. Specifically, sequencer 225 reads the source starting address for the DMA transfer from head pointer 256 in memory 250, which is address 17662014h (FIG. 4D). The destination address is host adapter intermediate buffer 260. When DMA engine 140 completes the transfer, TCB 401 is in buffer 260, and processing by sequencer 225 transfers to read site operation 504.

In operation 504, sequencer 225 reads the HA TCB array site field from intermediate buffer 260 to determine the destination site in host adapter TCB array 255, which in this example is TCB site 05. Upon completing operation 504, sequencer 225 initiates a second transfer TCB operation 505.

In transfer TCB operation 505, sequencer 225 uses DMA engine 140 to execute a second DMA transfer from intermediate buffer 260 to the destination site in host adapter TCB array 255. Notice that this transfer is within host adapter device 220 and so does not place any load on bus 260. When operation 505 is finished, delivery of the first TCB from HIM 202 to sequencer 225 is complete, and the TCB is placed in another queue for execution.

After completion of operation 505, sequencer 225 enters update head pointer operation 506. Specifically, sequencer 225 copies the address in next TCB address field 401A to head pointer 256. Thus, head pointer 256 identifies host address 13000074h as the site of the next TCB in endless new TCB queue 215. Operation 506 transfers processing to update count operation 507.

In operation 507, sequencer 225 increments removed TCB counter 232 so that the value of counter 232 is one. Operation 507 returns processing to count check operation 502.

Since counters 231 and 232 are still not equal, operations 503 to 507 are repeated for TCB 402. Upon completion of operation 507, head pointer 256 contains address 20F98802h and the values of counters 231 and 232 are equal. Thus, endless new TCB queue 215 still exists, and is ready for addition of other new TCBs.

The endless new TCB queue and TCB delivery process of this invention are particularly advantageous for host adapter devices with the following features:

A TCB delivery path that is shared with data transfers, and traffic along the delivery path associated with TCB deliveries must be minimized; and A mechanism whereby HIM 202 can notify sequencer 225 of a new TCB in endless new TCB queue 215, without pausing sequencer 225 and without sequencer 225 having to poll registers external to host adapter device 220.

While one embodiment of this invention has been described, the principles of this invention can be used in a wide variety of host adapters configurations. The particular components and transfer processes, i.e., DMA transfers, described are illustrative only and are not intended to limit the invention to the specific features described.

I claim:

1. A method of management of hardware control blocks for a device coupled to a system processor by a bus, said method comprising:

maintaining an endless queue of hardware command block storage sites in a memory accessible by both a device driver executing on said system processor and a process executing on a device processor of said device, wherein said endless queue is maintained to never be empty and so has at least one storage site allocated to said endless queue following an initialization, and a tail pointer delimiter for said endless queue is accessible only by a process executing on said system processor;

changing a first count, by said device driver, each time a hardware command block is loaded in said endless queue wherein said first count is readable by said process; and changing a second count, by said process, each time a hardware command block is removed from said endless queue.

2. A method of management of hardware control blocks for a device coupled to a system processor by a bus as in claim 1 wherein said device is a host adapter device.

3. A method of management of hardware control blocks for a device coupled to a system processor by a bus as in claim 2 wherein said first and second counts are stored within said host adapter device.

4. A method of management of hardware control blocks for a device coupled to a system processor by a bus as in claim 1 further comprising:

addressing a head hardware command block storage site of said endless queue using a head pointer wherein said head pointer is changed only by said process.

5. A method of management of hardware control blocks for a device coupled to a system processor by a bus as in claim 4 further comprising:

addressing a tail hardware command block storage site of said endless queue using a tail pointer wherein said tail pointer is changed only by said device driver, and said tail pointer is said tail pointer delimiter.

6. A method of management of hardware control blocks for a device coupled to a system processor by a bus as in claim 1 further comprising:

addressing a tail hardware command block storage site of said endless queue using a tail pointer wherein said tail pointer is changed only by said device driver, and said tail pointer is said tail pointer delimiter.

7. A method of management of hardware control blocks for a device coupled to a system processor by a bus as in claim 1 further comprising:

specifying an array site for storage of a hardware command block in a hardware command block array of said device in a field of the hardware command block.

8. A method of management of hardware control blocks for a device coupled to a system processor by a bus as in claim 1 further comprising:

specifying a storage site for a second hardware command block in said endless queue in a next hardware control address field of a first hardware command block.

9. A method of management of hardware control blocks for a device coupled to a system processor by a bus, said method comprising:

loading a hardware command block for said device in a storage site of an endless queue pointed to by a tail pointer, wherein said tail pointer is managed and accessible only by a device driver executing on said system processor, wherein said endless queue is maintained to never be empty and so has at least one storage site allocated to said endless queue following an initialization; and allocating a next storage site in said endless queue;

loading a field of said hardware command block with a pointer to said next storage site; and updating a count of hardware command blocks in said endless queue.

10. A method of management of hardware control blocks for a device coupled to a system processor by a bus as in claim 9, said method further comprising:

updating said tail pointer to address said next storage site.

11. A method of management of hardware control blocks for a device coupled to a system processor by a bus as in claim 9, said method further comprising:

allocating a storage site for said hardware command block in a hardware command block array of said device.

12. A method of management of hardware control blocks for a device coupled to a system processor by a bus as in claim 11, said method further comprising:

loading said storage site for said hardware command block in said hardware command block array of said device in another field of said hardware command block.

13. A method of management of hardware control blocks for a device coupled to a system processor by a bus as in claim 9, said method further comprising:

transferring a hardware command block at a head storage site of said endless queue to said device.

14. A method of management of hardware control blocks for a device coupled to a system processor by a bus as in claim 13, said method further comprising:

identifying said head storage site with a head pointer wherein said head pointer is managed by a process executing on a device processor of said device.

15. A method of management of hardware control blocks for a device coupled to a system processor by a bus as in claim 14, said method further comprising:

updating, by said process, a count of hardware command blocks removed from said endless queue.

16. A method of management of hardware control blocks for a device coupled to a system processor by a bus as in claim 14, said method further comprising:

updating, by said process, said head pointer.

17. A method of management of hardware control blocks for a device coupled to a system processor by a bus as in claim 16, said updating, by said process, said endless queue head storage site pointer further comprises:

copying a value in said field of said transferred hardware command block to said head pointer.

\* \* \* \* \*